(12) United States Patent
Gao et al.

(10) Patent No.: US 9,212,599 B2
(45) Date of Patent: Dec. 15, 2015

(54) CONTROL OF COMPRESSOR OUTLET PRESSURE BASED ON TEMPERATURE OF THERMAL LOAD COOLED BY COOLANT IN ELECTRIC VEHICLE

(71) Applicant: MAGNA E-CAR SYSTEMS OF AMERICA, INC., Aurora, CA (US)

(72) Inventors: Guangning Gao, Rochester Hills, MI (US); Neil Carpenter, Rochester Hills, MI (US)

(73) Assignee: Magna E-Car Systems of America, Inc., Aurora (CA)

( * ) Notice: Subject to any disclaimer, the term of this patent is extended or adjusted under 35 U.S.C. 154(b) by 136 days.

(21) Appl. No.: 14/042,868

(22) Filed: Oct. 1, 2013

(65) Prior Publication Data

US 2014/0096550 A1    Apr. 10, 2014

Related U.S. Application Data

(60) Provisional application No. 61/709,357, filed on Oct. 4, 2012.

(51) Int. Cl.
| | |
|---|---|
| *F01P 7/16* | (2006.01) |
| *F01P 3/12* | (2006.01) |
| *B60L 11/18* | (2006.01) |
| *B60H 1/00* | (2006.01) |
| *B60H 1/32* | (2006.01) |

(52) U.S. Cl.
CPC .............. *F01P 7/16* (2013.01); *B60H 1/00278* (2013.01); *B60L 11/1874* (2013.01); *F01P 3/12* (2013.01); *B60H 2001/00307* (2013.01); *B60H 2001/325* (2013.01); *Y02T 10/705* (2013.01); *Y02T 10/7005* (2013.01)

(58) Field of Classification Search
CPC ................. B60H 1/00278; B60H 2001/00307; B60H 2001/325; B60H 2001/3255; B60H 2001/3273; F01P 3/12; F01P 7/16; B60L 11/1874; Y02T 10/705; Y02T 10/7005
See application file for complete search history.

(56) References Cited

U.S. PATENT DOCUMENTS

| | | | |
|---|---|---|---|
| 5,641,016 | A | 6/1997 | Isaji et al. |
| 6,047,770 | A | 4/2000 | Suzuki et al. |
| 2004/0168454 | A1 | 9/2004 | Iritani |
| 2009/0241570 | A1* | 10/2009 | Kuribayashi et al. ........... 62/225 |
| 2012/0205088 | A1 | 8/2012 | Morisita et al. |
| 2012/0297809 | A1 | 11/2012 | Carpenter |

FOREIGN PATENT DOCUMENTS

| | | |
|---|---|---|
| EP | 2392486 A2 | 12/2011 |
| WO | 2012144151 A1 | 10/2012 |

OTHER PUBLICATIONS

International Search Report, mailed May 28, 2014 (PCT/US2013/062848).

* cited by examiner

*Primary Examiner* — Marc Norman
(74) *Attorney, Agent, or Firm* — Dickinson Wright PLLC (57) ABSTRACT

A thermal management system is provided for a vehicle having an electric traction motor. The system includes a coolant system configured to convey coolant through a first thermal load, a refrigerant circuit including a condenser and a compressor configured to compress a refrigerant, a control system and a sensor. The refrigerant circuit is configured to cool at least one second thermal load. The sensor is configured to send signals to the control system that are indicative of a temperature of the first thermal load. The control system is configured to control an outlet pressure of the compressor based on the signals.

18 Claims, 6 Drawing Sheets

| 234 | |
|---|---|
| Motor Circuit Sensed Temperature | Compressor Maximum Operating Speed |
| T1 | Smax1 |
| T2 | Smax2 |
| T3 | Smax3 |
| ... | ... |
| TN | SmaxN |

FIG. 6

| 232 | |
|---|---|
| Motor Circuit Sensed Temperature | Compressor Maximum Operating Pressure |
| T1 | Pmax1 |
| T2 | Pmax2 |
| T3 | Pmax3 |
| ... | ... |
| TN | PmaxN |

CONTROL OF COMPRESSOR OUTLET PRESSURE BASED ON TEMPERATURE OF THERMAL LOAD COOLED BY COOLANT IN ELECTRIC VEHICLE

CROSS-REFERENCE TO RELATED APPLICATIONS

This application claims the benefit of and priority to U.S. Provisional Application No. 61/709,357 filed Oct. 4, 2012. The entire disclosure of the above application is incorporated herein by reference.

FIELD OF THE DISCLOSURE

This disclosure relates to vehicles, and more particularly, to vehicles that have an electric traction motor.

BACKGROUND

This section provides background information related to the present disclosure which is not necessarily prior art.

Electric vehicles are vehicles that include electric traction motors that are powered by a battery pack, and which may further include an auxiliary power unit (APU) such as an internal combustion engine. Such vehicles are driven by the electric traction motor. In vehicles that include an APU, the APU may also be used to drive the vehicle, or may be used solely to generate electricity (e.g. by driving a generator) that is used to power the electric traction motor, or some combination of both.

Thermal systems in such vehicles may include a coolant system and a refrigerant system. The coolant system may be used to circulate coolant to the electric traction motor to keep the motor and related components sufficiently cool. The refrigerant system may be used to cool the vehicle cabin, and in some cases may further be used to cool the battery pack and related components.

It is beneficial to ensure that the various components in the vehicle receive sufficient cooling.

SUMMARY

This section provides a general summary of the disclosure and is not intended to be a full and comprehensive disclosure of its scope, aspects, objects and/or features.

In one aspect of the present disclosure a method is provided for operating a thermal management system of a vehicle having an electric traction motor. The method comprises the steps of a) circulating coolant through a first thermal load; b) circulating refrigerant through a refrigerant circuit including a condenser and a compressor to cool at least one second thermal load; c) receiving signals from a sensor that are indicative of a temperature of the first thermal load; and d) controlling an outlet pressure of the compressor based on the signals.

In another aspect of the present disclosure, a method is provided which comprises the steps of operating a compressor according to demand from a heat exchanger configured to cool at least one of a passenger cabin of a vehicle and a battery of the vehicle; and limiting the compressor to a maximum refrigerant outlet pressure based on a signal that is indicative of a temperature of a high-voltage current carrying component in the vehicle.

In yet another aspect of the present disclosure, a thermal management system is provided for a vehicle having an electric traction motor. The system includes a coolant system configured to convey coolant through a first thermal load, a refrigerant circuit including a compressor configured to compress refrigerant and a condenser, a control system and a sensor. The refrigerant circuit is configured to cool at least one second thermal load. The sensor is configured to send signals to the control system that are indicative of a temperature of the first thermal load. The control system is configured to control an outlet pressure of the compressor based on the signals.

Further areas of applicability will become apparent from the description provided herein. The description and specific examples in this summary are intended for purposes of illustration only, and are not intended to limit the scope of the present disclosure.

BRIEF DESCRIPTION OF THE DRAWINGS

The drawings illustrate, by way of example only, embodiments of the present disclosure. The non-limiting embodiments may be more fully appreciated by reference to the following detailed description when taken in conjunction with the accompanying drawings, in which.

DETAILED DESCRIPTION

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

Example embodiments are now provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
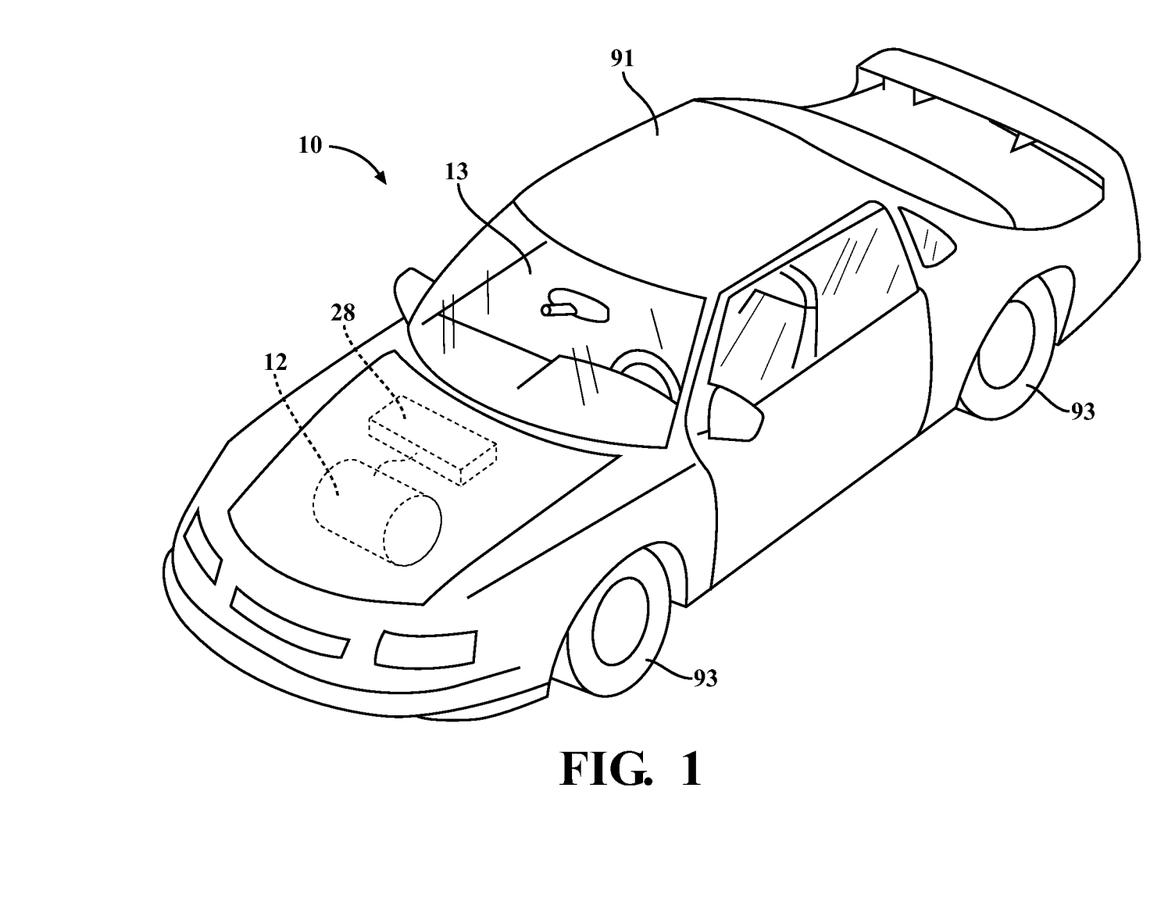
FIG. 1 is a perspective view of a vehicle.

FIG. 1 depicts an electric vehicle 10. The term 'electric vehicle' as used herein denotes a vehicle that includes an electric traction motor 12 (which may be referred to simply as an 'electric motor' for convenience). The electric vehicle 10 may also include an internal combustion engine, not shown, or alternatively it may lack an internal combustion engine. In embodiments wherein an internal combustion engine is provided, the engine may be operated simultaneously with the electric traction motor 12 (parallel hybrid), or it may be operated only when a battery pack (shown at 28) for the electric traction motor 12 has been substantially depleted (or depleted to a minimum acceptable state of charge). In embodiments wherein the engine is provided, the function of the engine may be to propel the vehicle, to charge the battery pack, to both propel the vehicle and charge the battery pack, or for some other purpose. Furthermore, the electric vehicle 10 may be any suitable type of vehicle, such as, for example, an automobile, a truck, an SUV, a bus, a van, a motorcycle or any other type of vehicle. The vehicle 10 includes a body 91, a plurality of wheels 93, electric traction motor 12 configured for driving at least one of the wheels 93, and battery pack 28 configured for providing power to the electric traction motor 12.

Figure 2:
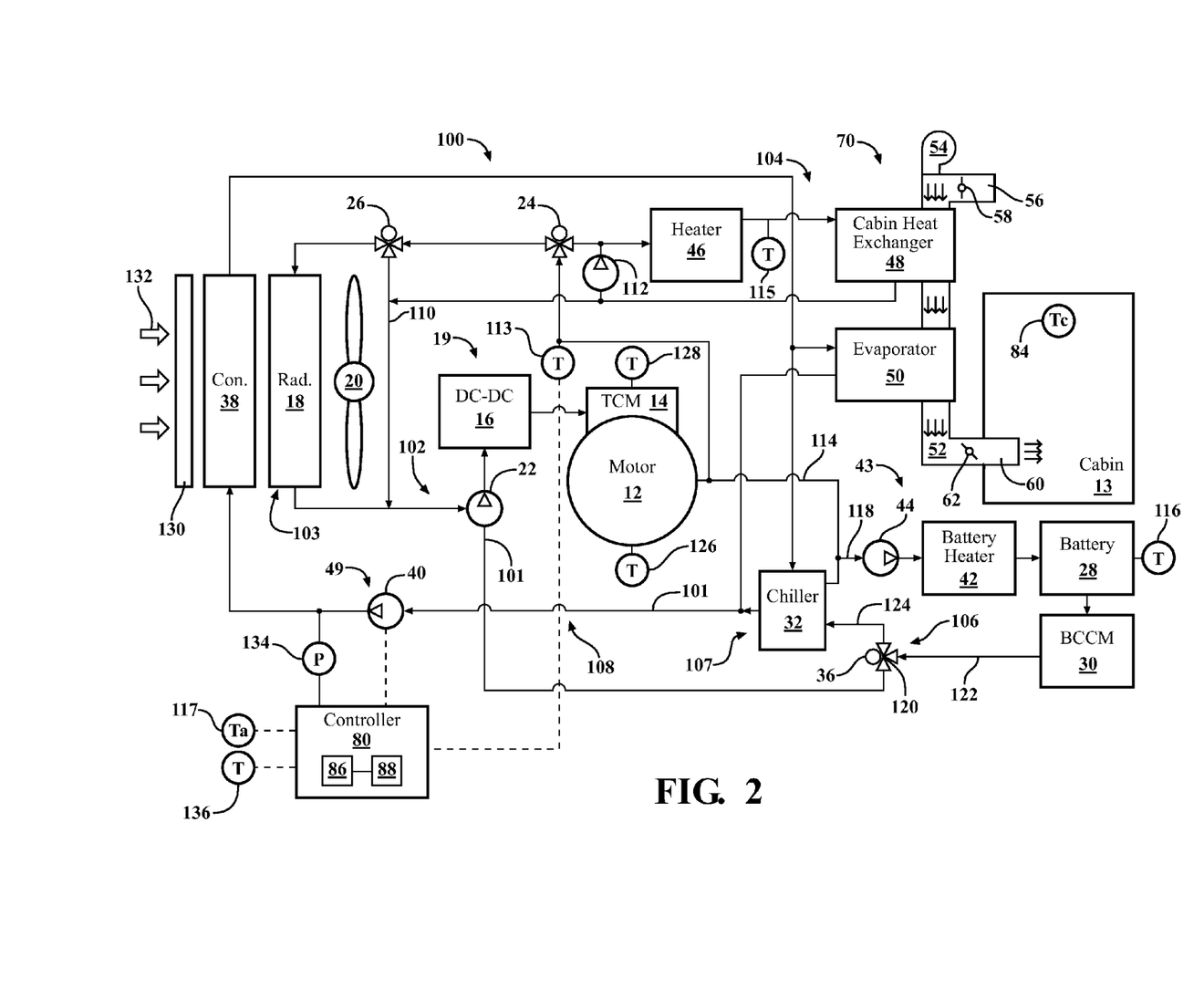
FIG. 2 is a functional block diagram of a thermal management system of the vehicle.

Reference is made to FIG. 2. As shown in FIG. 2, the vehicle 10 further includes a transmission-control module (TCM) 14, and a DC-DC converter 16 which are electrically connected to each other. The transmission-control module 14 may mount proximate to the electric traction motor 12. The transmission-control module 14 is part of a high-voltage electrical system of the vehicle 10 and is provided for controlling current flow to high-voltage electrical loads of the vehicle 10, such as the electric traction motor 12.

The DC-DC converter 16 receives electrical energy from the transmission-control module 14. The DC-DC converter 16 is configured to convert current from high voltage to low voltage. The DC-DC converter 16 sends the low-voltage current to a low-voltage battery (not shown) that is used to power low-voltage loads of the vehicle 10. The low-voltage battery may operate on any suitable voltage, such as 12 volts or 42 volts.

The electric motor 12, the TCM 14, the DC-DC converter 16, the battery pack 28, and other components described herein represent thermal loads in the vehicle 10. To manage these thermal loads, a thermal management system 100 is provided, which is shown as a schematic illustration in FIG. 2. In FIG. 2, a plurality of fluid conduits 101 that are part of the thermal management system 100 are depicted in solid line. A selected number of electrical connections are depicted in FIG. 2 in dashed line. Not all electrical connections and fluid conduits are shown, for the sake of clarity.

In the embodiment shown in FIG. 2, the fluid conduits 101 make up a plurality of conduit circuits including a motor conduit circuit 102, a cabin heating conduit circuit 104 and a battery pack conduit circuit 106, which are used to transport coolant through or around at least some of the thermal loads noted above, and to heat or cool the coolant as needed. In the embodiment shown in FIG. 2, the motor conduit circuit 102, the cabin heating conduit circuit 104 and the battery pack conduit circuit 106 are all fluidically connectable to each other so as to permit coolant to be transported from each of the circuits 102, 104, 106 to any other of the circuits 102, 104, 106. The thermal management system 100 further includes a refrigerant circuit 108 which permits the transport of refrigerant through or around at least some of the thermal loads noted above. The term 'coolant' denotes a liquid that is transported through and/or around components for controlling the temperature of those components. The coolant may in some instances draw heat from the components so as to cool the components, or, in other instances, the coolant may transfer heat contained therein to the components so as to heat the components. In an embodiment, the coolant may be a mixture of water and propylene glycol. The refrigerant may be any suitable refrigerant, such as R-134a.

The motor conduit circuit 102 is configured to transport coolant from a motor circuit thermal load, through one or more motor cooling devices, such as a radiator 18 and back to the motor circuit thermal load. The motor conduit circuit 102 and the one or more motor cooling devices together make up a motor cooling system 103. The motor circuit thermal load includes the electric traction motor 12 and may optionally include other components such as the transmission-control module 14 and the DC-DC converter 16. The radiator 18 that is configured to dissipate heat in the coolant flowing therethrough. The radiator 18 may be positioned anywhere suitable, such as, for example, at the front of the vehicle 10 so as to receive a flow of air as the vehicle 10 is being driven. A radiator fan 20 may be provided and positioned near the radiator 18 to assist in moving air across the radiator 18 so as to improve the heat dissipation capacity of the radiator 18. Coolant conduits 101 that connect the DC-DC converter 16, transmission-control module 14, the electric traction motor 12 and the radiator 18 make up the motor conduit circuit 102. A motor circuit pump 22 may be located fluidically between the radiator 18 and the DC-DC converter 16. The motor-circuit pump 22 is configured to pump the coolant output from the radiator 18 into the DC-DC converter 16, and then through the transmission-control module 14 and the electric traction motor 12 before returning to the radiator 18. A radiator bypass valve 26 (which may be referred to as a motor cooling system bypass valve and which may, for example, be an electrically-powered diverter valve) is controllable to selectively permit or prevent coolant flow through the radiator 18. The radiator bypass valve 26 may thus be positionable in a first position wherein coolant flow is directed through the radiator 18 prior to returning to the pump 22, and in a second position wherein coolant flow bypasses the radiator 18 and returns to the pump 22 via a radiator bypass conduit 110. It will be noted that when the valve 26 is in the first position, some coolant may still flow through the radiator bypass conduit 110. Similarly when the valve 26 is in the second position, some coolant may still flow through the radiator 18. However in the first position more coolant flows through the radiator 18 than in the second position.

The cabin-heating conduit circuit 104 and other components such as a cabin circuit heater 46 are provided for managing a cabin circuit thermal load that, in the example embodiment shown, includes a cabin heater core 48 for heat exchange between the coolant flowing therethrough and an air flow flowing into the cabin 13. An electrically powered cabin circuit valve 24 (e.g. an electrically powered diverter valve) is provided for sending coolant from the motor conduit circuit 102 into and through the cabin heating conduit circuit 104 so that coolant that was heated by the motor circuit thermal load can be used to heat the cabin 13. In a situation where there is a demand for heat in the cabin (e.g. by a climate control system in the cabin 13) and where the coolant in the motor conduit circuit 102 has been heated sufficiently by the motor circuit thermal load, the cabin circuit valve 24 may be positioned in a first position wherein coolant is sent from the motor conduit circuit 102 into the cabin heating conduit circuit 104 for flow through the cabin heater core 48. The coolant subsequently flows back into the motor conduit circuit 102, for example, through the radiator bypass conduit 110, and to the pump 22 so that it can be sent through the motor circuit thermal load again to be heated and again subsequently sent through the cabin heater core 48 to heat the airflow flowing into the cabin 13.

When the coolant from the motor conduit circuit 102 is not sufficiently hot for use in heating the cabin 13, the cabin circuit diverter valve 24 is positioned in a second position in which coolant flow is prevented from the motor conduit circuit 102 to the cabin conduit circuit 104. In such a situation, when there is a demand for heat in the cabin, a cabin circuit heater 46 is provided for heating coolant in the cabin heating conduit circuit 104. A cabin circuit pump 112 is provided to pump coolant through the cabin conduit circuit 104 when the cabin circuit heater 46 is needed to help heat the cabin. A comparison of the temperatures of the coolant in the motor conduit circuit 102 and the cabin heating conduit circuit 104 may be carried out by a control system 80 receiving input from a motor circuit temperature sensor 113 which may be positioned downstream from the motor circuit thermal load and from a cabin heating circuit temperature sensor 115 that may be positioned upstream from the cabin heating circuit thermal load and downstream from the cabin circuit heater 46.

The battery pack conduit circuit 106 and one or more battery pack cooling devices which are described below, together make up a battery pack cooling system 107, which is provided for managing a battery circuit thermal load. In the example embodiment shown, the battery pack thermal load includes the battery pack 28 and a battery charge control module 30. The battery pack 28 may be any suitable type of battery pack, such as one made up of a plurality of lithium polymer cells. Maintaining the battery pack 28 within an operational temperature range increases the operating life of the battery pack.

The battery charge control module 30 is provided for controlling the charging of the battery pack 28. The battery charge control module 30 is configured to connect the vehicle 10 to an external-energy source (for example, a 110-volt source or a 220-volt source). The battery charge control module 30 is configured to provide current received from the external electrical source to any of several destinations, such as, the battery pack 28.

A battery pack conduit circuit valve 36 (which may be an electrically powered diverter valve) controls the flow of coolant from the motor conduit circuit 102 to the battery pack conduit circuit 106. When the battery pack 28 requires heat and the coolant in the motor conduit circuit 102 is not sufficiently hot, a battery circuit heater 42 may be activated to heat coolant flowing to the battery pack 28, and the diverter valve 36 can be positioned in a first position in which a first conduit 122 that is fluidically between the battery pack conduit circuit outlet 120 and the battery pack 28 is fluidically connected to a second conduit 124 fluidically between the battery pack conduit circuit outlet 120 and the chiller 32 and in which the first conduit and second conduits 122 and 124 are fluidically isolated from the battery pack conduit circuit outlet 120. Thus, in the first position, the valve 36 directs coolant to flow back towards the battery circuit heater 42.

When the battery pack 28 requires heat and the coolant in the motor conduit circuit 102 is sufficiently hot, coolant can be directed from the motor conduit circuit 102 to the battery pack conduit circuit 106 through battery circuit feed conduit 114 by positioning the valve 36 in a second position in which the first conduit 122 is fluidically connected to the motor conduit circuit 102 through the battery pack conduit circuit outlet 120, and the first conduit 122 is fluidically isolated from the second conduit 124. Thus, in the second position, the valve 36 permits coolant flow from the battery pack conduit circuit 106 back to the motor conduit circuit 102, e.g., to the inlet of the motor circuit pump 22, which in turn permits coolant to flow from the motor conduit circuit 102 into the battery pack conduit circuit 106 via the battery circuit feed conduit 114.

The battery pack cooling system 107 may include a battery pack cooling device such as a chiller 32. In the battery pack conduit circuit 106, a battery circuit pump 44 is downstream from the chiller 32 and is upstream from the battery pack 28 (and the rest of the battery circuit thermal load). The chiller 32 is also in the refrigerant circuit 108 so as to receive refrigerant during use. The chiller 32 does not have refrigerant flowing therethrough in situations in which the battery pack 28 requires heating and is being heated. Other elements from the refrigerant circuit 108 include a compressor 40, a condenser 38, and an evaporator 50. The evaporator 50 is used to cool the vehicle cabin 13 through an HVAC system. The condenser 38 and compressor 40 are used to condition the refrigerant that is then provided to the evaporator 50 and the chiller 32. When the battery pack 28 requires cooling and the temperature of the coolant provided by the motor conduit circuit 102 is sufficiently low, the valve 36 may be positioned in the second position to cause coolant flow from the motor conduit circuit 102, through the battery pack conduit circuit 104 (and in particular the portion of the conduit circuit 104 that leads from a battery pack conduit circuit inlet, shown at 118, through the battery pack 28, and through a battery pack conduit system outlet shown at 120), and back to the motor conduit circuit 102. The inlet 118 as can be seen may be positioned downstream from the battery pack cooling device (chiller 32) and upstream from the battery pack circuit pump 44. The outlet 120, as can be seen, may be positioned downstream from the battery pack 28 and upstream from the battery pack cooling device (chiller 32) and is fluidically connected to the motor conduit circuit 102 via battery pack conduit circuit outlet conduit 121. With the valve 36 in the second position, coolant flow is prevented through the chiller 32 since the valve 36 prevents fluid communication from the inlet 118 to the outlet 120 through the chiller 32. The battery pack circuit pump 44 may be operated so as to assist in drawing coolant into the battery pack conduit circuit 106 and in pumping the coolant therethrough to the outlet 120.

When the battery pack 28 requires cooling and the temperature of the coolant provided by the motor conduit circuit 102 is not sufficiently low, the valve 36 may be positioned in the first position wherein coolant flow is prevented from the battery pack conduit circuit 106 to the outlet 120. This prevents coolant flow from the motor conduit circuit 102 into the battery pack conduit circuit 106 though the inlet 118. The battery pack circuit pump 44 is operated to provide closed loop coolant flow through the battery pack conduit circuit 106. The chiller 32 is operated so as to cool coolant flowing therethrough. The coolant then flows through the battery pack 28 to cool it and keep its temperature below a battery pack threshold temperature.

As can be seen in FIG. 2, the refrigerant circuit 108 is used to cool components such as the battery pack 28 and the vehicle cabin 13 which are not components in the motor circuit 102.

The control system 80 may be used to control and/or receive signals from the above-described components of the vehicle 10. The control system 80 may be a single unit, as has been shown in FIG. 2. Alternatively, the control system 80 may be a complex distributed control system having multiple individual controllers connected to one another over a controller area network. The control system 80 may include (and is not limited to) a processor 86 and a memory unit 88 coupled together. The processor 86 is capable of reading and executing processor-executable instructions tangibly stored in the memory unit 88. The control system 80 further includes an input-output interface (not shown) for connecting to other components of the vehicle 10 to allow the processor 86 to communicate with such components. Such components may include, for example, the pumps 22, 112 and 44, the valves 24, 26 and 36 and one or more temperature sensors, such as temperature sensors 113, 115 and 116 for sensing temperatures related to the thermal loads in the conduit circuits 102, 104 and 106 respectively, and an ambient temperature sensor shown at 117. The input-output interface may include a controller-area network bus (CAN bus) or the like. Temperature sensor 116 may be a battery pack temperature sensor, which is positioned to sense the temperature of the battery pack 28 (or more generally, it may be positioned to sense the temperature of the battery pack circuit thermal load). A temperature sensor 126 may be provided and positioned to sense the temperature of the motor 12 directly (i.e. a component of the motor 12 itself, whereas temperature sensor 113 senses the temperature of the coolant downstream from the motor 12). Thus, by providing one or both of the temperature sensors 113 and 126, the vehicle 10 includes a temperature sensor that senses a temperature that is indicative of the temperature of the motor 12. A temperature sensor 128 may be provided and positioned to sense the temperature of the TCM 14 directly (i.e. a component of the TCM 14 itself, whereas temperature sensor 113 senses the temperature of the coolant downstream from the TCM 14). Thus, by providing one or both of the temperature sensors 113 and 128, the vehicle 10 includes a temperature sensor that senses a temperature that is indicative of the temperature of the TCM 14.

The control system 80 is also electrically connected to other components of the vehicle 10 to monitor power consumption of the vehicle 10. For this purpose, in this example, the control system 80 is connected to the transmission-control module 14, which distributes electrical power throughout the vehicle 10. In this way, the control system 80 can monitor electrical power consumed by each of the electrically powered components of the vehicle 10. In other examples, power consumed by a component of the vehicle 10 can be determined in other ways, such as by directly monitoring by the control system 80 of the power consumption at the component. Irrespective of the specific method of monitoring, the control system 80 may have access to the instantaneous power usage (e.g., in watts) of each of the electrically powered components of the vehicle 10.

The arrangement of the condenser 38, the radiator 18 and the fan 20 may be such that the condenser 38 is immediately aft of the air inlet to the motor compartment shown at 130. The air inlet may be covered by a grille. The radiator 18 is aft of the condenser 38, and the fan 20 is aft of the radiator 18. As a result of this arrangement, an airflow (shown at 132) entering the motor compartment 130 through the air inlet moves along an airflow path wherein the airflow 132 passes first through the condenser 38, and then through the radiator 18. This airflow path is followed by an airflow 132 both when the fan 20 is operating (wherein the fan 20 draws an airflow 132 in through the air inlet, through the condenser 38 and then through the radiator 18, and when the vehicle 10 is being driven with the fan 20 off such that the forward speed of the vehicle 10 brings air into the motor compartment 130 through the air inlet.

As a result of the above noted arrangement, such an airflow 132 absorbs heat from the condenser 38 prior to passing through the radiator 18 so as to absorb heat from the radiator 18. Depending on how much heat the airflow 132 removes from the condenser 38, the amount of heat the airflow 132 removes at the radiator 18 may be significantly reduced as compared to a scenario where the airflow 132 received no heat from the condenser 38. In general, the more heat that the airflow 132 removes at the condenser 38, the less heat that the airflow 132 is able to remove at the radiator 18. Under driving conditions wherein one of the components in the motor circuit 102 is at or near its maximum permitted operating temperature, a significantly reduced capability of the radiator 18 to remove heat from the motor circuit 102 can result in the motor cooling system 103 being unable to lower the temperature of whichever component is at or near its maximum temperature. Thus, there is a possibility in such a scenario of the component overheating and being damaged.

The amount of heat that is transferred to the airflow 132 from the condenser 38 varies with the output pressure from the compressor 40. To prevent a situation where heat absorbed by an airflow 132 from the condenser 38 prevents the airflow 132 from receiving a sufficient amount of heat from the radiator 18 to cool the components in the motor circuit 102, the control system 80 may be configured to limit the output pressure from the compressor 40 under certain conditions in which it is determined that cooling of the motor circuit 102 is important. Thus, the control system 80 may limit the output of the compressor 40 based on the temperature of one or more components in the motor circuit 102.

Figure 3:
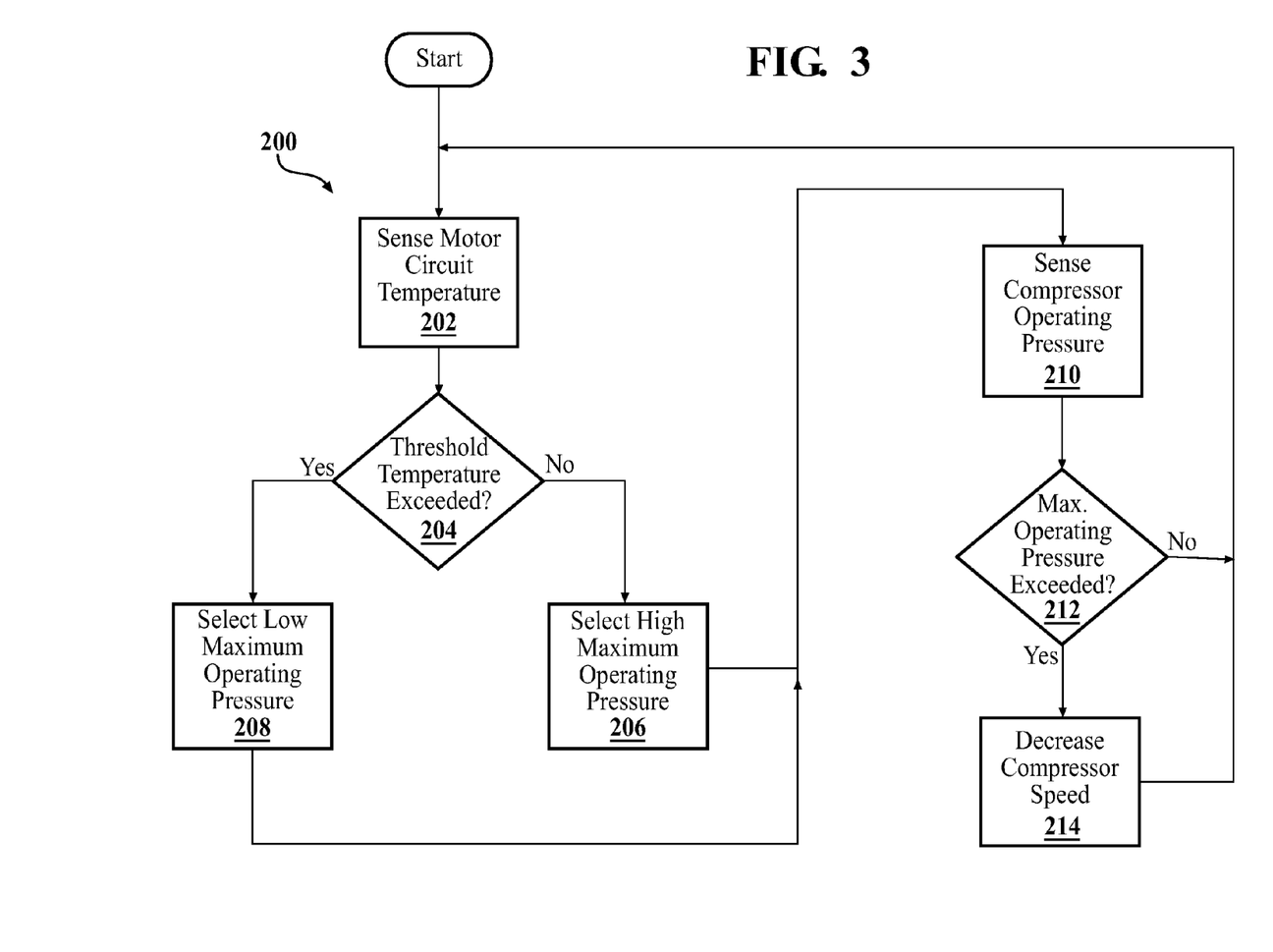
FIG. 3 is a flowchart of a method of operating the thermal management system.

FIG. 3 shows a flowchart of an example of a method 200 of operating the thermal management system 100. At step 202, the control system 80 receives a signal from one or more of the temperature sensors 113, 126 or 128. The signal is indicative of a temperature of one or more components of the motor circuit 102. For example, the signals from temperature sensor 126 are indicative of the temperature of the motor 12. The signals from temperature sensor 128 are indicative of the temperature of the TCM 14. The signals from temperature sensor 113 are indicative of the temperature of the coolant (which is itself a component of the motor circuit 102), and are also indicative of the temperature of the motor 12, the temperature of the TCM 14 and the temperature of the DC-DC converter 16 (all of which are components of the motor circuit 102).

At step 204, the control system 80 determines whether the temperature that the signal is indicative of exceeds a threshold temperature or not. Examples of threshold temperatures that may be applicable include, a signal that indicates a coolant temperature of more than 78 degrees Celsius, a signal that indicates an motor inverter temperature of more than 83 degrees Celsius, or a signal that indicates a motor coil temperature of over 134 degrees Celsius.

If the control system 80 determines that the temperature indicated by the signal does not exceed the threshold temperature, then the control system 80 proceeds to step 206 where a first, high value is selected as a maximum outlet pressure for the compressor 40. If the control system 80 determines that the temperature indicated by the signal does exceed the threshold temperature, then the control system 80 proceeds to step 208 where a second, low value is selected as an outlet threshold pressure for the compressor 40. The terms 'high' and 'low' are intended only to convey relative magnitude (i.e. to express that the second value is lower than the first value). Once the maximum outlet threshold pressure is set, the compressor 40 is controlled by the control system 80 in a way that substantially prevents the compressor 40 from exceeding the threshold pressure. Steps 210, 212 and 214 illustrate one example of such control. At step 210 the control system 80 receives signals from a pressure sensor 134 (e.g. which may be positioned at the outlet of the compressor 40). The signals may be indicative of the outlet pressure of the compressor 40. At step 212 the control system determines whether or not the pressure indicated by the signals of the compressor 40 exceeds the outlet threshold pressure that was set at step 206 or 208. If the outlet pressure does not exceed the threshold, then the control system 80 proceeds back to step 202. If the outlet pressure does exceed the threshold, then the control system 80 reduces the outlet pressure of the compressor 40 until the pressure is below the threshold, and then sends control back to step 202. In an example, the maximum outlet pressure of the compressor may be set to be some value such as 2650 kPa in situations where the temperature sensed at sensor 113, 126 or 128 as the case may be, is below the threshold temperature. If the pressure at the outlet of the compressor 40 exceeds this value, the speed of the compressor 40 is reduced quickly until the outlet pressure is below this value. The speed reduction may take place as an override to whatever other control scheme (e.g. a PID control scheme) is being used to control the compressor 40. If the control system 80 determines that the temperature exceeds the threshold temperature, then the control system 80 may set the maximum outlet threshold pressure to be 2500 kPa, such that if the compressor control scheme winds up bringing the compressor outlet pressure above this value, the control system 80 would, in response, decrease the compressor speed until the pressure fell below the value.

In an alternative embodiment, instead of steps 210, 212 and 214, where the outlet pressure of the compressor 40 is compared to the maximum threshold pressure, a "target" outlet pressure of the compressor 40 may be adjusted. For example, the compressor 40 may be controlled so as to have a selected target outlet pressure, which may be, for example, 2500 kPa in situations where the sensed motor circuit temperature does not exceed the threshold temperature. The particular control scheme used to control the compressor 40 may involve pressure swings of about 150 kPa above and below the target pressure, as the control system 80 attempts to bring the compressor 40 to the target pressure. Thus, effectively, the maximum outlet pressure for the compressor 40 would be about 2650 kPa. In the event that the control system 80 determines at step 204 that the threshold temperature indicated by the temperature sensor signals exceeds the threshold amount, the control system 80 may determine that the maximum threshold pressure for the compressor 40 should be reduced to 2500 kPa, similar to the example above. To carry this out, the control system 80 may, however, reduce the target pressure for the compressor to be 2350 kPa and may then continue to operate the compressor 40. Because the control scheme used will produce pressure swings of about 150 kPa during operation of the compressor 40 above and below the target pressure, the compressor 40 will effectively have a maximum outlet pressure of about 2500 kPa but it will be achieved without situations arising where the primary control scheme needs to be overridden.

While a temperature sensor 113, 126 and/or 128 has been described as being used by the control system 80 to control the outlet pressure of the compressor 40, other types of sensor could be used that in some way generate signals that are indicative of the temperature of one or more components in the motor circuit 102. For example, signals from a vehicle speed sensor, shown at 136, may be indicative to the control system 80 of the temperature of one or more components in the motor circuit 102. For example, as the vehicle speed increases, the airflow rate through the condenser 38 and the radiator 18 will increase (as will the airflow directly across the motor 12, TCM 14 and DC-DC converter 16 themselves), which will ultimately help cool components in the motor circuit 102 better than if the vehicle 10 were moving slowly or were stationary. Thus, the control system 80 may conclude that signals indicating an increase in vehicle speed are indicative of cooler motor circuit components, and as a result, the control system 80 may set a high maximum outlet threshold pressure for the compressor 40 (i.e. at step 206), and similarly, if signals indicate that the vehicle 10 is traveling slowly or is stopped, the control system 80 may set a low maximum outlet threshold pressure for the compressor 40 (i.e. at step 208).

The control system 80 may interpret vehicle speeds differently depending on the speeds. For example, within a moderate speed range, the control system 80 may determine that components of the motor circuit 102 are relatively cool by the high airflow, but at high speeds, the control system 80 may determine that the motor 12 must draw a lot of current to overcome drag so as to maintain the vehicle speed and that the increase in airflow is not sufficient to compensate for the increased amount of work the motor 12 must do, and so the control system 80 may determine that the motor 12 is relatively hot at very high vehicle speeds.

Alternatively, the current to the motor 12 may be used as a signal to the control system 80 that is indicative of the temperature of the motor 12 and of the TCM 14. Thus, the control system 80 may control the operation of the compressor 40 based on any suitable signal from any suitable sensor that is indicative of the temperature of one or more components in the motor circuit.

The control system 80 may consider the history of the vehicle's operation and/or signals from other sensors, when interpreting signals from the aforementioned sensors. For example, if the control system 80 has determined that the vehicle 10 has just climbed a long grade, and has now stopped, then the control system 80 may determine that the maximum outlet threshold pressure of the compressor 40 should be set to a low value. However, if the control system 80 has determined that the vehicle 10 is stationary but was off for the last several hours in a cool ambient environment, then the control system 80 may determine that the maximum outlet threshold pressure should be set to a high value.

In vehicles where the control system does not maintain the temperature of selected components in the motor circuit (e.g. the motor, the TCM) below selected thresholds, the vehicle's control system may be configured to protect these components by limiting power to such components or by shutting these components down entirely, thereby leaving the vehicle occupants stranded (referred to as a Quit-On-Road event). Thus, it is beneficial to limit the performance of the compressor 40 in order to avoid such an event.

As described above, the compressor 40 is used both for cooling the vehicle cabin 13 via the evaporator 50, and is used for cooling the battery pack 28 (via the chiller 32) under conditions where the coolant is not sufficiently cool on its own to perform that function. The low threshold pressure value that is selected at step 208 may be selected to be sufficiently high to ensure that the battery pack 28 is able to be kept cool under all conditions. In an event where cooling of the battery pack 28 via the chiller 32 is considered warranted by the control system 80, while a request for high air conditioning is requested from the vehicle cabin 13, the compressor 40 may not be able to provide sufficient output to meet both the request to cool the battery pack 28 and the request to cool the vehicle cabin 13 if the low threshold pressure value was selected for the compressor 40 at step 208. In such situations, the control system 80 may be configured to receive signals from a battery circuit temperature sensor 116 in the battery circuit 106. These signals are indicative of a temperature of at least one component in the battery circuit 106, such as, for example, the battery pack 28 and the battery charge control module 30. The temperature sensor 116 may be positioned anywhere suitable in the battery circuit 106 such as on the battery pack 28 so as to directly sense the temperature thereof, or on a conduit 101 in the battery circuit 106 to sense the coolant temperature in the battery circuit 106. If the control system 80 determines that the signals from the temperature sensor 116 are indicative of a temperature of a component of the battery circuit 106 that exceeds a maximum threshold temperature, then the control system 80 may preferentially send refrigerant to the chiller 32 to cool the battery pack 28, and may reduce the average flow rate of refrigerant to the evaporator 50. In embodiments wherein the temperature sensor 116 is used, the maximum threshold temperature that is used in relation to the signals from the temperature sensor 113, 126 or 128 may be referred to as the maximum motor circuit component threshold temperature, and the maximum threshold temperature that is used in relation to the signals from the temperature sensor 116 may be referred to as the maximum battery circuit component threshold temperature.

Reducing the average flow rate to the evaporator 50 may be carried out by intermittently shutting off refrigerant flow to the evaporator 50, or, in embodiments where a variable flow thermal expansion valve (TXV) is provided at the evaporator 50, the flow rate of refrigerant to the TXV may be reduced by some amount so that some air conditioning is available and provided on a continuous basis if requested even if it is less than the amount requested.

Figure 4:
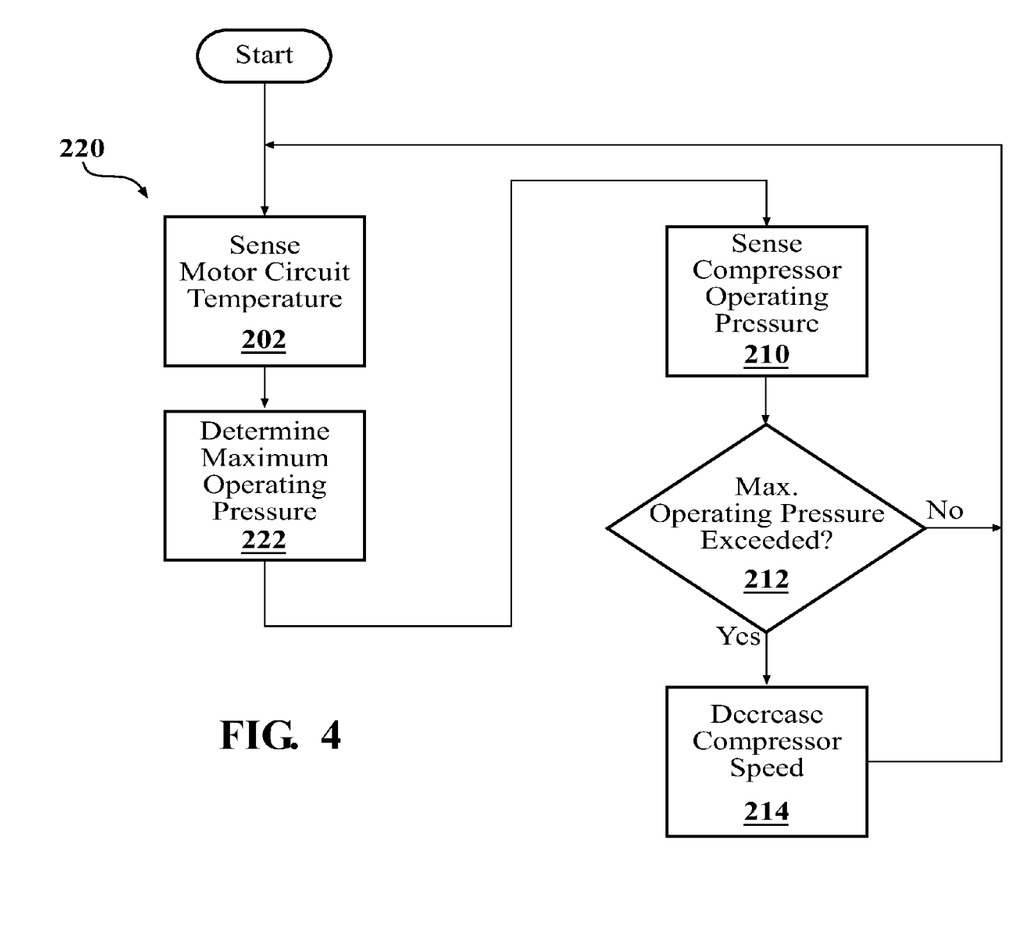
FIG. 4 is a flowchart of another method of operating the thermal management system.
Figure 5:
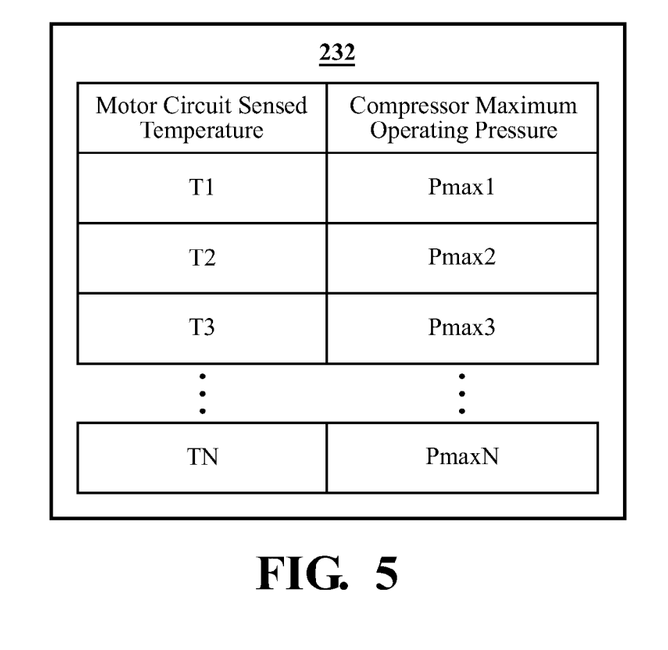
FIG. 5 shows a lookup table for the method of FIG. 4.
Figure 6:
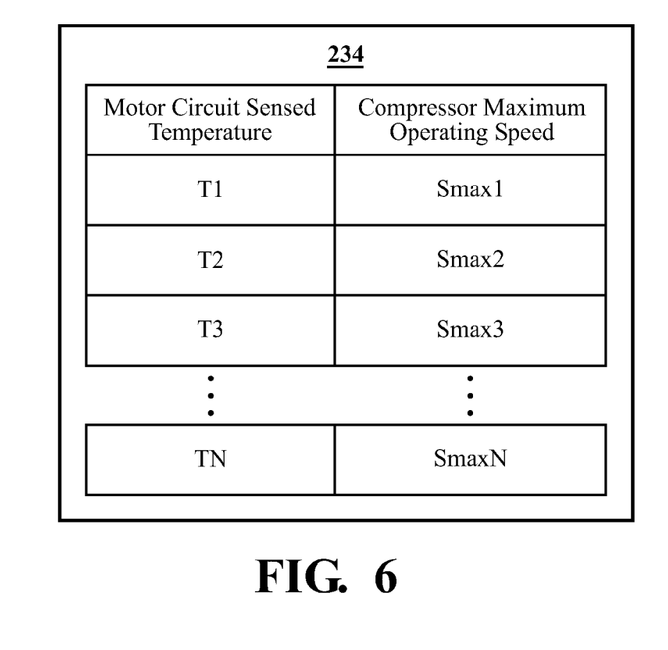
FIG. 6 shows a lookup table for compressor maximum operating speed.

Reference is now made to FIGS. 4 through 6. In FIG. 4, a method of controlling the compressor 40 is shown at 220, which replaces steps 204, 206 and 208 with step 222. In step 222, the sensed temperature indicated by the sensor signals is used to determine a maximum threshold value for the compressor outlet pressure via a lookup table shown at 232, as shown in FIG. 5, and/or a maximum threshold value for the compressor operating speed via a look-up table shown at 234, as shown in FIG. 6, or via calculation via a formula, or the like. In the lookup table 232 shown in FIG. 5, the maximum outlet threshold pressure for the compressor 40 is shown as Pmax1, Pmax2, Pmax3 . . . PmaxN, where there are N different ranges of motor circuit component temperature that the temperature indicated by the sensor signals may fall into. Thus, instead of having a single threshold for the temperature, a plurality of threshold temperatures may be used, or a formula may be used that provides continuously varying response in terms of maximum outlet pressure based on the temperature indicated by the sensor signals. Similarly, in lookup table 234, the maximum operating speed threshold value for compressor 40 is shown as Smax 1, Smax 2, Smax 3 . . . SmaxN, where there are N different ranges of motor circuit component temperature that the temperature indicated by the sensor signal may fall into.

Figure 7:
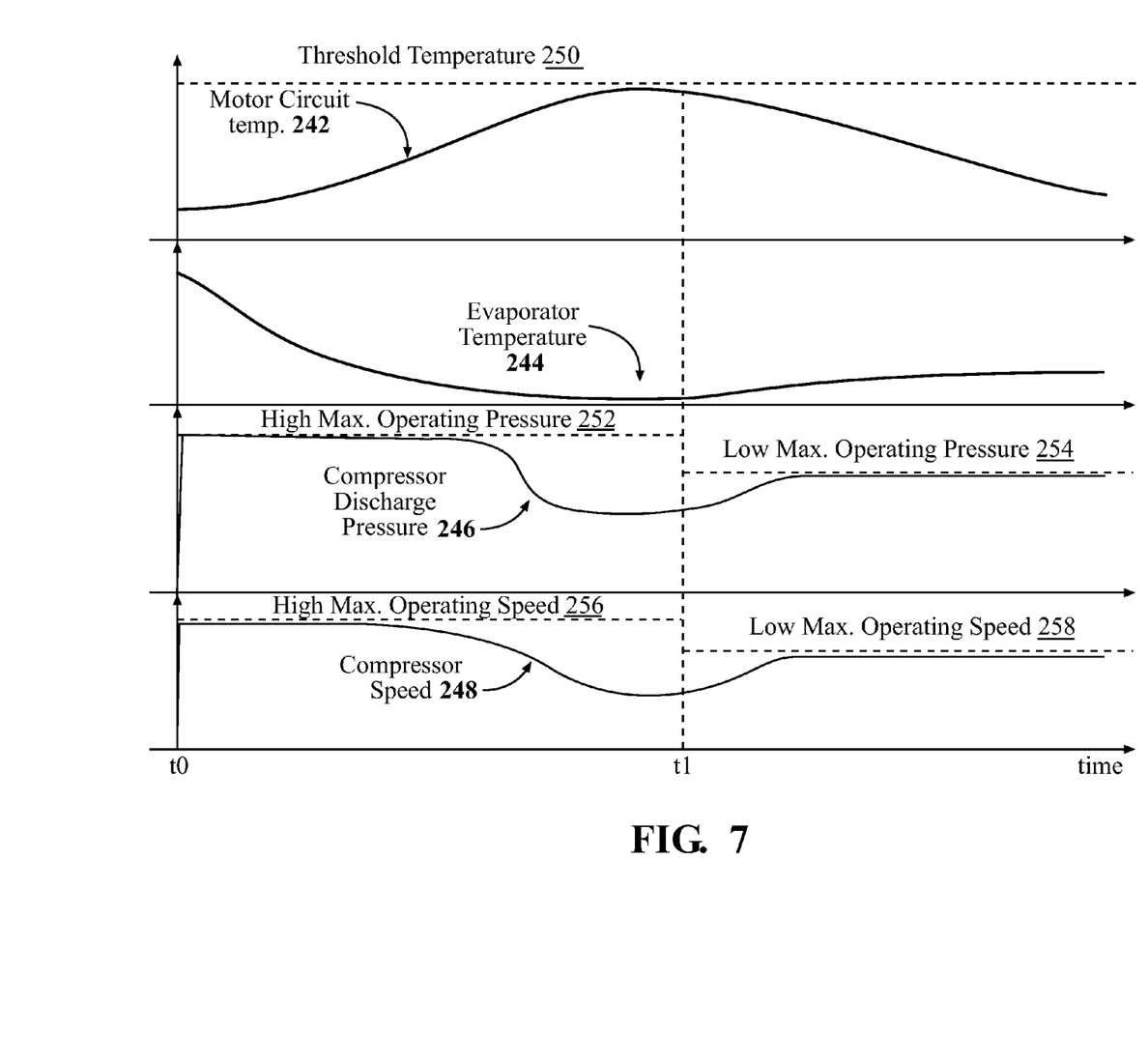
FIG. 7 is a plot of various operating characteristics of the thermal management system of the present disclosure.

It will be noted that the maximum outlet pressure of the compressor 40 is preferably set to a first or second amount in steps 206 or 208 or in the lookup table 232 in FIG. 5, as opposed to maximum compressor speed in the lookup table 234 in FIG. 6. In other words, the compressor speed is preferably controlled by the control system 80 so as to achieve a selected outlet pressure instead of being controlled to achieve a selected compressor speed. This is because the outlet pressure of the compressor 40 is considered to be a better indicator than the compressor speed, of the amount of heat that will be generated at the condenser 38. FIG. 7 provides an exemplary illustration of various operating characteristic relative to a threshold temperature value 250 versus time. Specifically, plot 242 is indicative of the motor circuit temperature while plot 244 is indicative of the evaporator temperature and the generally inverse relationship therebetween. Likewise, plot 246 is indicative of the outlet pressure of compressor 40 in relation to its first or high maximum operating pressure threshold 252 and its second or low maximum operating pressure threshold 254. Plot 248 is indicative of the operating speed of compressor 40 in relation to its first or high maximum operating speed threshold 256 and its second or low maximum operating speed threshold 258.

While the refrigerant system 108 is described as not being used to cool components in the motor circuit, it will be noted that the refrigerant system 108 may, at certain times, be used to cool components in the motor system 102, (e.g. in the event of an emergency), by cooling coolant in the battery circuit 106 via the chiller 32 and circulating the cooled coolant back to the motor circuit 102. However, in the embodiments described above, the control system 80 is programmed to control the operation of the compressor 40 even during periods where the refrigerant system 108 is not being used to cool any components in the motor system 102.

The TCM 14 and the motor 12 are examples of first thermal loads that are cooled using the coolant in the motor circuit 102. Other components may additionally or alternatively make up a first thermal load. Thus the sensors 113, 126, 128 and 136 are sensors that send signals to the control system 80 that are indicative of the temperature of the first thermal load. These sensors may be considered first sensors.

The battery pack 28, the BCCM 30 and the passenger cabin 13 are examples of second thermal loads that are cooled using the refrigerant system 108. Other components may constitute second thermal loads. The sensor 116 may be considered a second sensor.

While the foregoing provides certain non-limiting example embodiments, it should be understood that combinations, subsets, and variations of the foregoing are contemplated. The monopoly sought is defined by the claims.

What is claimed is:

1. A method of operating a thermal management system of a vehicle having an electric traction motor, the method comprising:
   circulating coolant through a first thermal load;
   circulating refrigerant through a refrigerant circuit including a condenser and a compressor to cool at least one second thermal load;
   receiving signals from a sensor that are indicative of a temperature of the first thermal load;
   determining if a threshold temperature is exceeded based on the signals received from the sensor;
   substantially preventing the outlet pressure of the compressor from exceeding a second maximum outlet threshold pressure if the threshold temperature is determined not to be exceeded; and
   substantially preventing the outlet pressure of the compressor from exceeding a second maximum outlet threshold pressure if the threshold temperature is determined to be exceed, wherein the second maximum outlet threshold pressure is lower than the first maximum outlet threshold pressure.

2. The method as claimed in claim 1, wherein a radiator is operable to cool the coolant, and wherein the radiator is positioned adjacent the condenser and receives an airflow passing through the condenser from a vehicle air inlet.

3. The method as claimed in claim 1, wherein the steps of substantially preventing the outlet pressure of the compressor from exceeding a first maximum outlet threshold pressure and substantially preventing the outlet pressure of the compressor from exceeding a second maximum outlet threshold pressure each includes controlling the speed of the compressor to control the outlet pressure of the compressor.

4. The method as claimed in claim a, wherein the first thermal load includes at least one component selected from the electric traction motor, and a transmission control module configured for controlling current flow to the electric traction motor.

5. The method as claimed in claim 4, wherein the sensor is a vehicle speed sensor for the vehicle.

6. The method as claimed in claim 4, wherein the at least one second thermal load includes at least one of: a battery pack for storing power for use by the electric traction motor and a passenger cabin of the vehicle.

7. A method as claimed in claim 4, wherein the at least one second thermal load includes a battery pack for storing power for use by the electric traction motor and a passenger cabin of the vehicle, and wherein the method further comprises:
    receiving signals from a second sensor that are indicative of a temperature of the battery pack; and
    preferentially sending refrigerant from the condenser to cool the battery pack and restricting the flow of refrigerant to cool the passenger cabin if the signals received from the second sensor are indicative of a temperature that exceeds a battery pack threshold temperature.

8. The method as claimed in claim 1, wherein the sensor is a temperature sensor that is positioned to sense the temperature of the coolant.

9. A thermal management system for a vehicle having an electric traction motor, the system comprising:
    a coolant system configured to convey coolant through a first thermal load;
    a refrigerant circuit including a compressor configured to compress refrigerant and a condenser, wherein the refrigerant circuit is configured to cool at least one second thermal load; a control system; and
    a sensor configured to send signals to the control system that are indicative of a temperature of the first thermal load, wherein the control system is configured to:
    determine if a threshold temperature is exceeded based on the signals,
    b) substantially prevent the outlet pressure of the compressor from exceeding a first maximum outlet threshold pressure if the threshold temperature is determined not to be exceeded, and
    c) substantially prevent the outlet pressure of the compressor from exceeding a second maximum outlet threshold pressure if the threshold temperature is determined to be exceeded and wherein the second maximum outlet threshold pressure is lower than the first maximum outlet threshold pressure.

10. The system as claimed in claim 9, further comprising a radiator that is operable to cool the coolant, and wherein the radiator is positioned adjacent the condenser and receives an airflow passing through the condenser from a vehicle air inlet.

11. The system as claimed in claim 9, wherein the control system is configured to control the speed of the compressor to control the outlet pressure of the compressor.

12. The system as claimed in claim 9, wherein the first thermal load includes at least one component selected from the electric traction motor, and a transmission control module configured for controlling current flow to the electric traction motor.

13. The system as claimed in claim 12, wherein the sensor is a vehicle speed sensor for the vehicle.

14. The system as claimed in claim 12, wherein the at least one second thermal load includes at least one of: a battery pack for storing power for use by the electric traction motor and a passenger cabin of the vehicle.

15. The system as claimed in claim 12, wherein the at least one second thermal load includes a battery pack for storing power for use by the electric traction motor and a passenger cabin of the vehicle, and wherein the control system is further configured to:
    d) receive signals from a second sensor that are indicative of a temperature of the battery pack; and
    e) preferentially send refrigerant from the condenser to cool the battery pack and restrict the flow of refrigerant to cool the passenger cabin if, during step c) the signals received in step d) are indicative of a temperature that exceeds a battery pack threshold temperature.

16. The system as claimed in claim 9, wherein the sensor is a temperature sensor that is positioned to sense the temperature of the coolant.

17. A method of operating a thermal management system of a vehicle having an electric traction motor, the method comprising:
    circulating coolant through a coolant circuit to cool a first thermal load including at least one of the electric traction motor and a transmission control module configured for controlling current flow to the electric traction motor;
    circulating refrigerant through a refrigerant circuit having a condenser and a compressor configured to cool a second thermal load including at least one of a battery pack storing power for use by the electric traction motor and a passenger compartment of the vehicle;
    receiving signals from a sensor that are indicative of a temperature of the first thermal load;
    determining if a threshold temperature is exceeded based on the signals received by the sensor;
    controlling the compressor to prevent a refrigerant outlet pressure from exceeding a first maximum outlet threshold pressure if the threshold temperature is determined not to be exceeded; and
    controlling the compressor to prevent the refrigerant outlet pressure from exceeding a second maximum outlet threshold pressure if the threshold temperature is determined to be exceeded, wherein the second maximum outlet threshold pressure is lower than the first maximum outlet threshold pressure.

18. The method as claimed in claim 17 wherein the sensor is a temperature sensor positioned to sense the temperature of the coolant, and wherein the method further comprises receiving signals from a second temperature sensor that are indicative of a temperature of the battery pack, and preferentially sending refrigerant from the condenser to cool the battery pack and restricting the flow of refrigerant to cool the passenger cabin when the signals received from the second temperature sensor are indicative of a temperature that exceeds a battery pack threshold temperature.

* * * * *

UNITED STATES PATENT AND TRADEMARK OFFICE
CERTIFICATE OF CORRECTION

PATENT NO. : 9,212,599 B2  Page 1 of 1
APPLICATION NO. : 14/042868
DATED : December 15, 2015
INVENTOR(S) : Guangning Gao et al.

It is certified that error appears in the above-identified patent and that said Letters Patent is hereby corrected as shown below:

IN THE CLAIMS

In Column 12, Line 37, Claim 1, please change "exceeding a second maximum" to --exceeding a first maximum--.
In Column 12, Line 43, Claim 1, please change "exceed," to --exceeded,--.
In Column 12, Line 57, Claim 4, please change "in claim a" to --in claim 1--.
In Column 13, Line 27, Claim 9, before "determine if a", please insert --a)--.

Signed and Sealed this
Twelfth Day of April, 2016

Michelle K. Lee
*Director of the United States Patent and Trademark Office*